United States Patent [19]

Dones et al.

[11] Patent Number: 5,889,076
[45] Date of Patent: *Mar. 30, 1999

[54] RADIATION CURABLE RHEOLOGY MODIFIERS

[75] Inventors: Miguel A. Dones, Hatfield; Theresa M. Miller, St. Peters, both of Pa.

[73] Assignee: Henkel Corporation, Gulph Mills, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 636,298

[22] Filed: Apr. 23, 1996

Related U.S. Application Data

[63] Continuation-in-part of Ser. No. 631,291, Apr. 8, 1996, Pat. No. 5,804,671.

[51] Int. Cl.$^6$ .............................. C08J 3/28; C08F 283/00
[52] U.S. Cl. .................. 522/143; 525/531; 522/144; 522/146
[58] Field of Search .................................. 522/143, 144, 522/146; 525/531

[56] References Cited

U.S. PATENT DOCUMENTS

| | | | |
|---|---|---|---|
| 2,569,502 | 10/1951 | Swern et al. | 260/348 |
| 2,736,609 | 2/1956 | Vinal | 300/2 |
| 2,824,851 | 2/1958 | Hall | 260/45.5 |
| 3,066,112 | 11/1962 | Bowen | 260/41 |
| 3,179,623 | 4/1965 | Bowen | 260/47 |
| 3,317,465 | 5/1967 | Doyle et al. | 260/47 |
| 3,377,406 | 4/1968 | Newey et al. | 160/837 |
| 3,432,478 | 3/1969 | May | 260/78.5 |
| 3,808,114 | 4/1974 | Tsuchihara et al. | 204/159.16 |
| 4,218,294 | 8/1980 | Brack | 204/159.13 |
| 4,547,562 | 10/1985 | Nichols | 528/119 |
| 4,652,492 | 3/1987 | Seiner et al. | 428/414 |
| 4,937,296 | 6/1990 | Golownia | 525/423 |
| 4,987,160 | 1/1991 | Frihart | 522/164 |
| 5,155,177 | 10/1992 | Frihart | 525/420 |
| 5,204,386 | 4/1993 | Ersun-Hallsby et al. | 523/443 |
| 5,349,011 | 9/1994 | Reichert et al. | 524/602 |
| 5,385,986 | 1/1995 | Frihart et al. | 525/420.5 |

OTHER PUBLICATIONS

Encyclopedia of Polymer Science & Engineering, vol. 11, pp. 204–205 (John Wiley & Sons, Inc., NY, NY 1988).

*Primary Examiner*—Alan L. Rotman
*Assistant Examiner*—Charanjit S. Awlakh
*Attorney, Agent, or Firm*—Wayne C. Jaeschke; John E. Drach; Steven J. Trzaska

[57] ABSTRACT

A composition that is useful in the preparation of radiation curable coatings is provided. The composition comprises the reaction product of an epoxy component and an acid component comprised of an ethylenically unsaturated carboxylic acid or reactive derivative thereof, reacted in the presence of, or post-reaction blended with, a polyamide based on a polymerized fatty acid. The polyamide preferably has a number average molecular weight of less than about 10,000 g/mole. Also provided is a polymerizable composition comprised of the composition comprised of the reaction product, the polyamide, and a reactive diluent. A method of coating a substrate is also provided which comprises applying to a substrate a composition comprised of the reaction product and the polyamide and exposing said composition to radiation to cure said composition.

40 Claims, No Drawings

RADIATION CURABLE RHEOLOGY MODIFIERS

CROSS-REFERENCE TO RELATED APPLICATIONS

This application is a continuation-in-part of U.S. Ser. No. 08/631,291 (entitled "Radiation Curable Rheology Modifiers", by Miguel Dones and Theresa Miller) filed Apr. 8, 1996, now U.S. Pat. No. 5,804,671 the disclosure of which is incorporated herein by reference.

FIELD OF THE INVENTION

The present invention relates to radiation curable compositions and to methods of preparing and using such compositions.

BACKGROUND OF THE INVENTION

The use of acrylate resins to formulate radiation curable coatings and printing inks is discussed generally in *Encyclopedia of Polymer Science and Engineering*, vol. 11, pp. 204–205 (John Wiley & Sons, Inc. N.Y., N.Y., 1988). It is disclosed that low molecular weight acrylates, including monoacrylates, are required to adjust the viscosity of the coating which is applied as a liquid, usually without solvent.

SUMMARY OF THE INVENTION

The is invention relates to a composition that is useful in the preparation of radiation curable coatings comprising the reaction product of an epoxy component and an acid component comprised of an ethylenically unsaturated carboxylic acid or reactive derivative thereof, reacted in the presence of a polyamide based on a polymerized fatty acid. The polyamide typically has a number average molecular weight of less than about 10,000 g/mole. This invention also relates to a blend of (a) the reaction product of an epoxy component and an acid component comprised of an ethylenically unsaturated carboxylic acid or reactive derivative thereof, and (b) a polyamide based on a polymerized fatty acid. This invention also relates to a polymerizable composition comprised of a composition as described above and a reactive diluent. This invention also relates to a method of coating a substrate comprising applying to a substrate a composition comprised of the reaction product described above and exposing said composition to radiation to cure said composition.

DETAILED DESCRIPTION OF THE INVENTION

Useful epoxides are th e glycidyl ethers of both polyhydric phenols and polyhydric alcohols, epoxidized fatty acids or drying oil acids, epoxidized diolefins, epoxidized di-unsaturated acid esters, as well as epoxidized unsaturated polyesters, preferably containing an average of more than one epoxide group per molecule. Preferred epoxy components will have an average epoxy functionality greater than about 1.5, typically from about 2 to about 8. In certain embodiments, the epoxy component will contain primarily diepoxides and, thus, the epoxy functionality of the epoxy component will typically vary from about 1.8 to about 2.4. In other embodiments, the epoxy component will contain primarily higher epoxides (e.g. epoxidized linseed oil) and, thus, the epoxy functionality of the epoxy component will vary from about 2.6 to about 6. Depending upon whether the epoxy resin is substantially monomeric or polymerized to some degree, the preferred epoxy compounds will have a molecular weight of from about 300 to about 600 and an epoxy equivalent weight of between about 150 and about 1,200.

Representative examples of the epoxides include condensation products of polyphenols and (methyl)epichlorohydrin. For the polyphenols, there may be listed bisphenol A, 2,2'-bis(4-hydroxyphenyl)methane (bisphenol F), halogenated bisphenol A, resorcinol, tetrahydroxyphenylethane, phenol novolac, cresol novolac, bisphenol A novolac and bisphenol F novolac. There may also be listed epoxy compounds of the alcohol ether type obtainable from polyols such as alkylene glycols and polyalkylene glycols, e.g. ethylene glycol, butanediol, hexanediol, neopentyl glycol, glycerine, polyethylene glycol, polypropylene glycol and alkylene oxide-adduct of bisphenols, and (methyl)epichlorohydrin; glycidyl amines obtainable from anilines such as diaminodiphenylmethane, diaminophenylsulfone and p-aminophenol, and (methyl)epichlorohydrin; glycidyl esters based on acid anhydrides such as phthalic anhydride and tetrahydro-or hexahydrophthalic anhydride; and alicyclic epoxides such as 3,4-epoxy-6-methylcyclohexylmethyl and 3,4-epoxy-6-methylcyclohexyl carboxylate.

Glycidyl polyethers of polyhydric phenols are made from the reaction of a polyhydric phenol with epihalohydrin or glycerol dihalohydrin, and a sufficient amount of caustic alkali to combine with the halogen of the halohydrin. Glycidyl ethers of polyhydric alcohols are made by reacting at least about 2 moles of an epihalohydrin with 1 mole of a polyhydric alcohol such as ethylene glycol, pentaerythritol, etc., followed by dehydrohalogenation.

In addition to polyepoxides made from alcohols or phenols and an epihalohydrin, polyepoxides made by the known peracid methods are also suitable. Epoxides of unsaturated esters, polyesters, diolefins and the like can be prepared by reacting the unsaturated compound with a peracid. Preparation of polyepoxides by the peracid method is described in various periodicals and patents and such compounds as butadiene, ethyl linoleate, as well as di- or tri-unsaturated drying oils or drying oil acids, esters and polyesters can all be converted to polyepoxides. Epoxidized drying oils are also well known, these polyepoxides usually being prepared by reaction of a peracid such as peracetic acid or performic acid with the unsaturated drying oil according to U.S. Pat. No. 2,569,502.

In certain embodiments, the epoxide is an epoxidized triglyceride containing unsaturated fatty acids. The epoxidized triglyceride may be produced by epoxidation of one or more triglycerides of vegetable or animal origin. The starting materials may also contain saturated components. However, epoxides of fatty acid glycerol esters having an iodine value of 50 to 150 and preferably 85 to 115 are normally used. For example, epoxidized triglycerides containing 2 to 10% by weight of epoxide oxygen are suitable. This epoxide oxygen content can be established by using triglycerides with a relatively low iodine value as the starting material and thoroughly epoxidizing them or by using triglycerides with a high iodine value as starting material and only partly reacting them to epoxides. Products such as these can be produced from the following fats and oils (listed according to the ranking of their starting iodine value): beef tallow, palm oil, lard, castor oil, peanut oil, rapeseed oil and, preferably, cottonseed oil, soybean oil, train oil, sunflower oil, linseed oil. Examples of typical epoxidized oils are epoxidized soybean oil with an epoxide value of 5.8 to 6.5, epoxidized sunflower oil with an epoxide value of 5.6 to 6.6, epoxidized linseed oil with an epoxide value of 8.2 to 8.6 and epoxidized train oil with an epoxide value of 6.3 to 6.7.

Further examples of polyepoxides include the diglycidyl ether of diethylene glycol or dipropylene glycol, the diglycidyl ether of polypropylene glycols having molecular weight up to, for example, about 2,000, the triglycidyl ether of glycerine, the diglycidyl ether of resorcinol, the diglycidyl ether of 4,4'-isopropylidene diphenol, epoxy novolacs, such as the condensation product of 4,4'-methylenediphenol and epichlorohydrin and the condensation of 4,4'-isopropylidenediphenol and epichlorohydrin, glycidyl ethers of cashew nut oil, epoxidized soybean oil, epoxidized unsaturated polyesters, vinyl cyclohexene dioxide, dicyclopentadiene dioxide, dipentene dioxide, epoxidized polybutadiene and epoxidized aldehyde condensates such as 3,4-epoxycyclohexyl methyl-3',4'-epoxycyclohexane carboxylate.

Particularly preferred epoxides are the glycidyl ethers of bisphenols, a class of compounds which are constituted by a pair of phenolic groups interlinked through an intervening aliphatic bridge. While any of the bisphenols may be used, the compound 2,2-bis (p-hydroxyphenyl) propane, commonly known as bisphenol A, is more widely available in commerce and is preferred. While polyglycidyl ethers can be used, diglycidyl ethers are preferred. Especially preferred are the liquid Bisphenol A-epichlorohydrin condensates with a molecular weight in the range of from about 300 to about 600.

The acid component is comprised of an ethylenically unsaturated acid. Particularly suitable ethylenically unsaturated monocarboxylic acid are the alpha, include acrylic acid, beta-acryloxypropionic acid, methacrylic acid, crotonic acid, and alpha-chloroacrylic acid. Preferred examples are acrylic acid and methacrylic acid. The acid component can also contain other carboxylic acids. In certain embodiments, the acid component will be comprised of a minor amount, e.g. less than about 50% of the total acid equivalents, more typically less than about 20% of the total acid equivalents, of a fatty acid. The fatty acids are saturated and/or unsaturated aliphatic monocarboxylic acids containing 8 to 24 carbon atoms or saturated or unsaturated hydroxycarboxylic acids containing 8 to 24 carbon atoms. The carboxylic acids and/or hydroxycarboxylic acids may be of natural and/or synthetic origin. Examples of suitable monocarboxylic acids are caprylic acid, 2-ethylhexanoic acid, capric acid, lauric acid, myristic acid, palmitic acid, palmitoleic acid, stearic acid, isostearic acid, oleic acid, elaidic acid, petroselic acid, linoleic acid, linolenic acid, elaeostearic acid, conjuene fatty acid, ricinoleic acid, arachic acid, gadoleic acid, behenic acid, erucic acid and brassidic acid and the technical mixtures thereof obtained, for example, in the pressure hydrolysis of natural fats and oils, in the oxidation of aldehydes from Roelen's oxo synthesis, or as monomer fraction in the dimerization of unsaturated fatty acids. In a particularly preferred embodiment, the fatty acid is derived from technical mixtures of the fatty acids mentioned which are obtainable in the form of the technical mixtures typically encountered in oleochemistry after the pressure hydrolysis of oils and fats of animal or vegetable origin, such as coconut oil, palm kernel oil, sunflower oil, rape oil, rapeseed oil and coriander oil and beef tallow. However, the fatty acid may also contain a branched fatty acid residue, for example the residue of 2-ethyl hexanoic acid, isopalmitic acid or isostearic acid.

Preferred fatty acids are mixtures obtained from natural sources, e.g. palm oil, palm kernel oil, coconut oil, rapeseed oil (from old high-erucic acid plants or from new low-erucic acid plants, a.k.a. canola oil), sunflower oil (from old low-oleic plants or from new high-oleic plants), castor oil, soybean oil, cottonseed oil, peanut oil, olive oil, olive kernel oil, coriander oil, castor oil, meadowfoam oil, chaulmoogra oil, tea seed oil, linseed oil, beef tallow, lard, fish oil and the like. Naturally occurring fatty acids typically are present as triglycerides of mixtures of fatty acids wherein all fatty acids have an even number of carbon atoms and a major portion by weight of the acids have from about 12 to 18 carbon atoms and are saturated or mono-, di-, or tri-unsaturated.

The preferred epoxy resins, i.e., those made from bisphenol A, will have two epoxy groups per molecule. Thus, the product of a reaction with acrylic or methacrylic acid will contain an epoxy (meth)acrylate compound having a main chain of polyepoxide and both terminals of a (meth)acrylate group, respectively. Accordingly, the stoichiometric amount of acrylic acid to form a diacrylate adduct would be two moles of acid for each two epoxy groups. In practice, however, it is preferred to use an amount of acid slightly in excess of the amount necessary to cover both epoxy groups. Therefore, the amount of acrylic acid reacted is typically between about 2.001 moles to about 2.1 moles, and more typically between about 2.01 and 2.05 moles of acid per two epoxy groups.

In certain embodiments, the reaction of the epoxide and the acid takes place in the presence of a polyamide based on a polymerized fatty acid. In other embodiments, the polyamide is blended with the reaction product after the reaction. If the melting point of the polyamide is above room temperature, it is preferred to melt the polyamide during or prior to mixing it with the reaction product to aid formation of a blend of the polyamide and the reaction product.

The polyamide preferably has a number average molecular weight of less than about 10,000 grams/mole. Low melting polyamide resins melting within the approximate range of about 90° C. to about 130° C. may be prepared from polymeric fatty acids and aliphatic polyamines. Typical of the polyamines which may be used are ethylene diamine, diethylene triamine, triethylene tetramine, tetraethylene pentamine, 1,4-diaminobutane, 1,3-diaminobutane, hexamethylene diamine, 3-(N-isopropylamine)-propylamine, 3,3'-iminobispropylamine, and the like. A preferred group of these low melting polyamides are derived from polymeric fatty acids, and ethylene diamine and are solid at room temperature.

Suitable such polyamides are commercially available under the trade designation of VERSAMID polyamide resins, e.g. VERSAMID 335, 750 and 744, and are amber-colored resins having a number average molecular weight up to about 10,000, preferably from 1,000 to 4,000 and a softening point from about below room temperature to 190° C.

The preferred polyamide is VERSAMID 335 polyamide which is commercially available from Henkel Corporation and has an amine value of 3, a number average molecular weight of 1699, as determined by gel permeation chromatography (GPC) using a polystyrene standard, and a polydispersity of 1.90.

The preparation of such VERSAMID polyamide resins is well known and by varying the acid and/or functionality of the polyamine, a great variety of viscosities, molecular weights and levels of active amino groups spaced along the resin molecule can be obtained. Typically, the VERSAMID polyamide resins useful herein have amine values from 0 to 25, preferably 0 to 10, more preferably 0 to 5; viscosities of from about 1 to 30 poises (at 160° C.) and polydispersities of less than 5. The amine value and number average molecular weight of the polyamide can be determined as described in U.S. Pat. No. 4,652,492 (Seiner, et. al.), the disclosure of which is incorporated herein by reference.

Whether present during the reaction, or post-blended with the reaction product, the polyamide is incorporated into the composition in an amount not exceeding about 50% by weight based on the combined weight of the epoxide and acid components and the polyamide. Preferably, an amount not exceeding about 25% by weight is utilized and most preferred is an amount of from about 5% to about 15% by weight.

The reaction between the epoxide and acid can be performed over a wide range of temperatures, e.g. from about 40° C. to about 150° C., more typically from about 50° C. to about 130° C. and preferably between about 90° C. and about 110° C., at atmospheric, sub-atmospheric or superatmospheric pressure; preferably in an inert atmosphere. Esterification is continued until an acid number of about 5 to about 15 is obtained. This reaction ordinarily takes place in about 8 to about 15 hours. To prevent premature or undesirable polymerization of the product or the reactants, it is advantageous to add a vinyl inhibitor to the reaction mixture. Suitable vinyl polymerization inhibitors include tert-butylcatechol, hydroquinone, 2,5-ditertiarybutylhydroquinone, hydroquinonemonoethyl ether, etc. Advantageously, the inhibitor is included in the reaction mixture at a concentration of about 0.005 to about 0.1% by weight based on the total of the reagents.

The reaction between the epoxide and the acid proceeds slowly when uncatalyzed, and can be accelerated by suitable catalysts which preferably are used, such as, for example, the tertiary bases such as trimethyl amine, tributylamine, pyridine, dimethylaniline, tris (dimethylaminomethyl)-phenol, triphenyl phosphine, tributyl dimethylaniline, tris (dimethylaminomethyl)-phenol, triphenyl phosphine, tributyl phosphine, tributylstilbine; alcoholates such as sodium methylate, sodium butylate, sodium methoxyglycolate, etc.; quatemary compounds such as tetramethylammonium bromide, tetramethylammonium chloride, benzyltrimethylammonium chloride, and the like. At least 0.01 percent, based on total weight of reagents, preferably at least 0.1 percent, of such catalyst is desirable.

Typical examples of suitable monomers which can be used and added to the reaction mixture before or during the reaction, or added after the reaction, as a reactive diluent, are the vinyl or vinylidene monomers containing ethylenic unsaturation, and which can copolymerize with the compositions of this invention are, styrene, vinyl toluene, tertiary butyl styrene, alpha-methyl-styrene, monochlorostyrene, dichlorostyrene, divinylbenzene, ethyl vinyl benzene, diisopropenyl benzene, methyl acrylate, ethyl acrylate, methyl methacrylate, ethyl methacrylate, acrylonitrile, methacrylonitrile, the vinyl esters, such as vinyl acetate and the monovinyl esters of saturated and unsaturated aliphatic, monobasic and polybasic acids, such as the vinyl esters of the following acids: propionic, isobutyric, caproic, oleic, stearic, acrylic, methacrylic, crotonic, succinic, maleic, fumaric, itaconic hexahydrobenzoic, citric, tartaric, etc., as well as the corresponding allyl, methallyl, etc., esters of the aforementioned acids, the itaconic acid monoesters and diesters, such as the methyl, ethyl, butyl esters, etc.; the maleic and fumaric acid monoesters, diesters and their amide and nitrile compounds, such as diethyl maleate, maleyl tetramethyl diamide, fumaryl dinitrile, dimethyl fumarate; cyanuric acid derivatives having at least one copolymerizable unsaturated group attached directly or indirectly to the triazine ring such as diallyl ethyl cyanurate, triallyl cyanurate, etc., ethers such as vinyl allyl ether, tetrachloro phthalate, diallyl tetrabromophthalate, dibromopropargyl acrylate, as well as the partial fusible or soluble polymerizable polymers of the hereinabove listed monomers, etc.

In preparing the polymerizable compositions of this invention containing the reaction product of this invention and one or more of the monomers of the type listed hereinabove, the relative amount of the monomers can vary broadly. In general, however, the monomer or monomers are used at less than about 50% by weight of the composition, typically in the range of about 1% to about 30% by weight, and more typically in the range of about 5% to about 15% by weight.

The new derivatives of this invention can be cured or converted to the infusible state, alone or in admixture with other monomers or polymers by exposure to radiation alone or in the presence of radical generating catalysts such as benzoin, benzoin ethers, and Michler's Ketone. The free radical initiator is typically present at from about 0.01 to about 20% by weight of the radiation curable components. Examples of useful radiation include ultraviolet light and ionizing radiation such as generated by X-Ray machines; electron accelerators such as van der Graaf machines, travelling wave linear accelerators, particularly of the type described in U.S. Pat. No. 2,736,609, natural and synthetic radioactive material, for example cobalt 60, etc. To ensure that the composition does not prematurely polymerize, a free radical inhibitor may be added to the polymerizable composition. Examples of suitable inhibitors include hydroquinone and the methyl ether thereof or butylated hydroxy toluene at a level of from about 5 ppm to about 2000 ppm by weight of the polymerizable components. Additives which are particularly useful in prolonging the shelf-life of the composition can also be used, e.g. ultra-violet stabilizers such as Florstab UV-II from Kromachem.

The compositions of this invention are useful in the preparation of molded, cast, laminated and coated products as adhesives, impregnants and protective coatings. They can be used alone or with fillers, dyes, pigments, opacifiers, lubricants, plasticizers, natural or synthetic resins or other modifying bodies.

In the method of coating a substrate according to the invention, the composition, optionally containing a photoinitiator, is applied to the surface of a substrate and subsequently exposed to a radiation source until an adherent dry polymerized film is formed on the substrate. Sources of radiant energy appropriate for initiating cure of the formulations have been described extensively in the literature and are well known to those skilled in the art. These include various sources of particulate and non-particulate radiation producing wavelengths generally less than 700 nanometers. Especially useful is actinic radiation in the 180–440 nm range which can be conveniently obtained by use of one of several commercially available ultra-violet sources specifically intended for this purpose. These include low, medium and high pressure mercury vapor lamps, He-Cd and Ar lasers, xenon arc lamps, etc. Photoinitiator systems having a corresponding sensitivity to light in this wave band are normally incorporated into the formulation and upon irradiation lead to the formation of reactive species capable of initiating free radical polymerization. Similarly, free radical polymerization may be induced by exposure of the formulation to an electron beam without the use of a photoinitiator. Equipment capable of generating a curtain of electrons with energies between 150 and 300 KeV is particularly suitable for this purpose and its use is well documented in the literature.

Particularly preferred sources of radiation emit electromagnetic radiation predominantly in the ultra-violet band.

When such a source is used, the polymerizable composition preferably contains a photoinitiator susceptible to ultra-violet radiation, e.g. benzoin, benzoin ethers, alpha, alpha-dimethoxy-alpha-phenylacetophenone, diethoxyacetophenone, alpha-hydroxy-alpha, alpha-dimethylacetophenone, and 1-benzoylcyclohexanol.

The amount of radiation necessary to cure the composition will of course depend on the angle of exposure to the radiation, the thickness of the coating to be applied, and the amount of polymerizable groups in the coating composition, as well as the presence or absence of a free radical initiating catalyst. For any given composition, experimentation to determine the amount of radiation sensitive pi bonds not cured following exposure to the radiation source is the best method of determining the amount and duration of the radiation required. Typically, an ultra-violet source with a wavelength between 200 and 420 nm (e.g. a filtered mercury arc lamp) is directed at coated surfaces carried on a conveyor system which provides a rate of passage past the ultra-violet source appropriate for the radiation absorption profile of the composition (which profile is influenced by the degree of cure desired, the thickness of the coating to be cured, and the rate of polymerization of the composition).

The composition is useful for placement on a wide range of substrates including paper, rigid and flexible plastics, metallic substrates, cement, glass, asbestos products, wood and the like. Examples of formulation categories include, but are not limited to, the following: overprint varnishes for paper and board; lithographic, screen, letterpress, flexographic, and gravure printing inks; stereolithography baths; pressure-sensitive and assembly adhesives; vinyl floor coatings; pigmented and unpigmented wood finishes; coatings for optical fiber; waterborne spray-applied coatings; base and top coatings for rigid and flexible plastics; etch and solder photomasks.

A preferred use of the polymerizable compositions of this invention is in the

A preferred use of the polymerizable compositions of this invention is in the formulation of radiation curable inks. When formulated into an ink, the polymerizable composition of the reaction product and diluent can be a major proportion or a minor proportion by weight of the ink.

The following examples illustrate the invention more fully, however, they are not intended to limit the scope of the invention and numerous variations will be evident to those skilled in the art. In this specification, and the following examples, all parts, ratios and percentages are on a weight basis unless otherwise indicated.

EXAMPLES

Example 1

Charge 49.99 parts by weight of diglycidyl ether of bisphenol A, available as DER 383 from Dow Chemical as epoxy compound, 0.36 parts by weight of triphenylphosphine as esterification catalyst, and 10 parts by weight of polymerized fatty acid based polyamide with an amine value of 3 and a number average molecular weight of about 1699, which is commercially available from Henkel Corporation as VERSAMID 335 polyamide resin to a reactor kettle. In a separate vessel, premix 18.23 parts by weight of acrylic acid, 0.28 parts by weight of an ultraviolet stabilizer available as Florstab UV-II from Kromachem, and 0.05 parts by weight of the monomethyl ether of hydroquinone as inhibitor. Heat reactor kettle and contents to 90° C. and maintain. Begin addition of pre-mix to reactor kettle. The premix is at room temperature and is added over a two-hour period. In a separate vessel, pre-mix 5.61 parts by weight of lauric acid and 0.36 parts by weight of triphenylphosphine as additional catalyst. When premix additions are complete, heat reactor kettle and contents to 110°–115° C. and maintain. The reaction is finished when the acid value of the contents is less than 5 mg KOH/g. When the reaction is finished and is at 110° C., add a triacrylate of a three mole propoxylate of glycerol, available as Photomer 4094 from Henkel Corporation, in an amount of 15 parts by weight as a monomer diluent and additional ultraviolet stabilizer available as Florstab UV-II from Kromachem, in an amount of 0.12 parts by weight and then cool before packaging.

A blue ink can be prepared from the composition set forth above by mixing 20 parts by weight of the composition with 27.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 13 parts by weight of propoxylated glyceryl triacrylate (available as PHOTOMER 4094 from Henkel Corporation, Ambler, Pa.), 18 parts by weight of a blue pigment, 2 parts by weight of talc, 5 parts by weight of a clay, 2 parts by weight of a photoinitiator available from Ciba-Geigy as Irgacure 907 and 2 parts by weight of a photoinitiator available from Ciba-Geigy as Irgacure 369. A black ink can be prepared from the composition set forth above by mixing 20 parts by weight of the composition with 33.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 14 parts by weight of propoxylated glyceryl triacrylate (available as PHOTOMER 4094 from Henkel Corporation, Ambler, Pa.), 15 parts by weight of a black pigment, 2 parts by weight of talc, 1 part by weight of a photoinitiator available from Aceto Chemical as Quantacure ITX, 3 parts by weight of a photoinitiator available from Ciba-Geigy as Irgacure 907 and 1 part by weight of a photoinitiator available from Ciba-Geigy as Irgacure 369.

Example 2

The procedure of Example 1 can be undertaken using the diglycidyl ether of bisphenol A, available as DER 383 from Dow Chemical, in an amount of 51.02 parts by weight, as the epoxide compound, a polymerized fatty acid based polyamide with an amine value of 3 and a number average molecular weight of about 1699, which is commercially available from Henkel Corporation as VERSAMID 335 polyamide resin, in an amount of 8.48% by weight, the monomethyl ether of hydroquinone in a total amount of 0.04 parts by weight as inhibitor, triphenylphosphine as esterification catalyst in a total amount of 0.74 parts by weight, and acrylic acid in an amount of 18.61 parts by weight. After addition of the acrylic acid, 5.73 parts by weight of lauric acid was also added and allowed to react. Following completion of the reaction, a triacrylate of a three mole propoxylate of glycerol, available as Photomer 4094 from Henkel Corporation, in an amount of 15 parts by weight was added as the monomer diluent and an ultraviolet stabilizer available as Florstab UV-II from Kromachem, in a total amount of 0.38 parts by weight, was also added.

A blue ink can be prepared from the composition set forth above by mixing 20 parts by weight of the composition with 27.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 13 parts by weight of propoxylated glyceryl triacrylate (available as PHOTOMER 4094 from Henkel Corporation, Ambler, Pa.), 18 parts by weight of a blue pigment, 2 parts by weight of talc, 5 parts by weight of a clay, 2 parts by weight of a photoinitiator available from Ciba-Geigy as Irgacure 907 and 2 parts by weight of a photoinitiator available from Ciba-Geigy as Irgacure 369. A black ink can be prepared from the composition set forth above by mixing 20 parts by weight of the composition with 33.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 14 parts by weight of propoxylated glyceryl triacrylate (available as PHOTOMER 4094 from Henkel Corporation, Ambler, Pa.), 15 parts by weight of a black pigment, 2 parts by weight of talc, 1 part by weight of a photoinitiator available from Aceto Chemical as Quantacure ITX, 3 parts by weight of a photoinitiator available from Ciba-Geigy as Irgacure 907 and 1 part by weight of a photoinitiator available from Ciba-Geigy as Irgacure 369.

Example 3

Charge 52.87 parts by weight of diglycidyl ether of bisphenol A, available as DER 383 from Dow Chemical as epoxy compound, 0.19 parts by weight of triphenylphosphine as esterification catalyst, 10 parts by weight of polymerized fatty acid based polyamide with an amine value of 3 and a number average molecular weight of about 1699, which is commercially available from Henkel Corporation as VERSAMID 335 polyamide resin, and 0.05 parts by weight of the monomethyl ether of hydroquinone as inhibitor, to a reactor kettle. In a separate vessel, premix 21.39 parts by weight of acrylic acid, 0.3 parts by weight of an ultraviolet stabilizer available as Florstab UV-II from Kromachem, and 0.1 parts by weight of triphenylphosphine as additional esterification catalyst. Heat reactor kettle and contents to 90° C. and maintain. Begin addition of pre-mix to reactor kettle. The premix is at room temperature and is added over a two-hour period. When premix addition is complete, heat reactor kettle and contents to 110°–115° C. and maintain. The reaction is finished when the acid value of the contents is less than 5 mg KOH/g. When the reaction is finished and is at 110° C., add a triacrylate of a three mole propoxylate of glycerol, available as Photomer 4094 from Henkel Corporation, in an amount of 15 parts by weight as a monomer diluent and additional ultraviolet stabilizer available as Florstab UV-II from Kromachem, in an amount of 0.1 parts by weight and then cool before packaging.

A blue ink can be prepared from the composition set forth above by mixing 20 parts by weight of the composition with 27.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 13 parts by weight of propoxylated glyceryl triacrylate (available as PHOTOMER 4094 from Henkel Corporation, Ambler, Pa.), 18 parts by weight of a blue pigment, 2 parts by weight of talc, 5 parts by weight of a clay, 2 parts by weight of a photoinitiator available from Ciba-Geigy as Irgacure 907 and 2 parts by weight of a photoinitiator available from Ciba-Geigy as Irgacure 369. A black ink can be prepared from the composition set forth above by mixing 20 parts by weight of the composition with 33.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 14 parts by weight of propoxylated glyceryl triacrylate (available as PHOTOMER 4094 from Henkel Corporation, Ambler, Pa.), 15 parts by weight of a black pigment, 2 parts by weight of talc, 1 part by weight of a photoinitiator available from Aceto Chemical as Quantacure ITX, 3 parts by weight of a photoinitiator available from Ciba-Geigy as Irgacure 907 and 1 part by weight of a photoinitiator available from Ciba-Geigy as Irgacure 369.

Example 4

Charge 45.21 parts by weight of diglycidyl ether of bisphenol A, available as DER 383 from Dow Chemical, and 7.40 parts by weight of the diglycidyl ether of 1,4-butylene glycol as epoxy compounds, 0.15 parts by weight of triphenylphosphine as esterification catalyst, 10 parts by weight of polymerized fatty acid based polyamide with an amine value of 3 and a number average molecular weight of about 1699, which is commercially available from Henkel Corporation as VERSAMID 335 polyamide resin, 0.05 parts by weight of the monomethyl ether of hydroquinone as inhibitor, and 2.16 parts by weight of acrylic acid, to a reactor kettle. In a separate vessel, premix 19.48 parts by weight of acrylic acid, 0.27 parts by weight of an ultraviolet stabilizer available as Florstab UV-II from Kromachem, and 0.07 parts by weight of triphenylphosphine as additional esterification catalyst. Heat reactor kettle and contents to 90° C. and maintain. Begin addition of pre-mix to reactor kettle. The premix is at room temperature and is added over a two-hour period. When premix addition is complete, add 0.09 parts by weight of triphenylphosphine as additional esterification catalyst, heat reactor kettle and contents to 110°–115° C. and maintain. The reaction is finished when the acid value of the contents is less than 5 mg KOH/g. When the reaction is finished and is at 110° C., add a triacrylate of a three mole propoxylate of glycerol, available as Photomer 4094 from Henkel Corporation, in an amount of 15 parts by weight as a monomer diluent and additional ultraviolet stabilizer available as Florstab UV-II from Kromachem, in an amount of 0.12 parts by weight and then cool before packaging.

A blue ink can be prepared from the composition set forth above by mixing 20 parts by weight of the composition with 27.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 13 parts by weight of propoxylated glyceryl triacrylate (available as PHOTOMER 4094 from Henkel Corporation, Ambler, Pa.), 18 parts by weight of a blue pigment, 2 parts by weight of talc, 5 parts by weight of a clay, 2 parts by weight of a photoinitiator available from Ciba-Geigy as Irgacure 907 and 2 parts by weight of a photoinitiator available from Ciba-Geigy as Irgacure 369. A black ink can be prepared from the composition set forth above by mixing 20 parts by weight of the composition with 33.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 14 parts by weight of propoxylated glyceryl triacrylate (available as PHOTOMER 4094 from Henkel Corporation, Ambler, Pa.), 15 parts by weight of a black pigment, 2 parts by weight of talc, 1 part by weight of a photoinitiator available from Aceto Chemical as Quantacure ITX, 3 parts by weight of a photoinitiator available from Ciba-Geigy as Irgacure 907 and 1 part by weight of a photoinitiator available from Ciba-Geigy as Irgacure 369.

Example 5

Charge 60.28 parts by weight of epoxidized soybean oil having an epoxide oxygen content of 6.5 to 7.0% as epoxy compound, 0.19 parts by weight of triphenylphosphine as esterification catalyst, 10 parts by weight of polymerized fatty acid based polyamide with an amine value of 3 and a number average molecular weight of about 1699, which is commercially available from Henkel Corporation as VERSAMID 335 polyamide resin, 0.05 parts by weight of the monomethyl ether of hydroquinone as inhibitor, and 0.62 parts by weight of acrylic acid, to a reactor kettle. In a separate vessel, premix 12.35 parts by weight of acrylic acid, 0.3 parts by weight of an ultraviolet stabilizer available as Florstab UV-II from Kromachem, and 1.11 parts by weight of triphenylphosphine as additional esterification catalyst. Heat reactor kettle and contents to 90° C. and maintain. Begin addition of pre-mix to reactor kettle. The premix is at room temperature and is added over a two-hour period. When premix addition is complete, heat reactor kettle and contents to 110°–115° C. and maintain. The reaction is finished when the acid value of the contents is less than 5 mg KOH/g. When the reaction is finished and is at 110° C., add a triacrylate of a three mole propoxylate of glycerol, available as Photomer 4094 from Henkel Corporation, in an amount of 15 parts by weight as a monomer diluent and additional ultraviolet stabilizer available as Florstab UV-II from Kromachem, in an amount of 0.1 parts by weight and then cool before packaging.

A blue ink can be prepared from the composition set forth above by mixing 20 parts by weight of the composition with 27.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 13 parts by weight of propoxylated glyceryl triacrylate (available as PHOTOMER 4094 from Henkel Corporation, Ambler, Pa.), 18 parts by weight of a blue pigment, 2 parts by weight of talc, 5 parts by weight of a clay, 2 parts by weight of a photoinitiator available from Ciba-Geigy as Irgacure 907 and 2 parts by weight of a photoinitiator available from Ciba-Geigy as Irgacure 369. A black ink can be prepared from the composition set forth above by mixing 20 parts by weight of the composition with 33.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 14 parts by weight of propoxylated glyceryl triacrylate (available as PHOTOMER 4094 from Henkel Corporation, Ambler, Pa.), 15 parts by weight of a black pigment, 2 parts by weight of talc, 1 part by weight of a photoinitiator available from Aceto Chemical as Quantacure ITX, 3 parts by weight of a photoinitiator available from Ciba-Geigy as Irgacure 907 and 1 part by weight of a photoinitiator available from Ciba-Geigy as Irgacure 369.

Example 6

Charge 60.43 parts by weight of epoxidized linseed oil having an epoxide oxygen content of 8.5% to 9.5% by weight as epoxy compound, 0.18 parts by weight of triphenylphosphine as esterification catalyst, 10 parts by weight of polymerized fatty acid based polyamide with an amine value of 3 and a number average molecular weight of about 1699, which is commercially available from Henkel Corporation as VERSAMID 335 polyamide resin, 0.05 parts by weight of the monomethyl ether of hydroquinone as inhibitor, and 1.13 parts by weight of acrylic acid, to a reactor kettle. In a separate vessel, premix 12.28 parts by weight of acrylic acid, 0.3 parts by weight of an ultraviolet stabilizer available as Florstab UV-II from Kromachem, and 0.53 parts by weight of triphenylphosphine as additional esterification catalyst. Heat reactor kettle and contents to 90° C. and maintain. Begin addition of pre-mix to reactor kettle. The premix is at room temperature and is added over a two hour period. When premix addition is complete, heat reactor kettle and contents to 110°–115° C. and maintain. The reaction is finished when the acid value of the contents is less than 5 mg KOH/g. When the reaction is finished and is at 110° C., add a triacrylate of a three mole propoxylate of glycerol, available as Photomer 4094 from Henkel Corporation, in an amount of 15 parts by weight as a monomer diluent and additional ultraviolet stabilizer available as Florstab UV-II from Kromachem, in an amount of 0.1 parts by weight and then cool before packaging.

A blue ink can be prepared from the composition set forth above by mixing 20 parts by weight of the composition with 27.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 13 parts by weight of propoxylated glyceryl triacrylate (available as PHOTOMER 4094 from Henkel Corporation, Ambler, Pa.), 18 parts by weight of a blue pigment, 2 parts by weight of talc, 5 parts by weight of a clay, 2 parts by weight of a photoinitiator available from Ciba-Geigy as Irgacure 907 and 2 parts by weight of a photoinitiator available from Ciba-Geigy as Irgacure 369. A black ink can be prepared from the composition set forth above by mixing 20 parts by weight of the composition with 33.5 parts by weight of a difunctional acrylic ester derived from a low molecular weight aromatic epoxy resin (available as PHOTOMER 3016 from Henkel Corporation, Ambler, Pa.), 10 parts by weight of a bisphenol A ethoxylate diacrylate (available as PHOTOMER 4028 from Henkel Corporation, Ambler, Pa.), 14 parts by weight of propoxylated glyceryl triacrylate (available as PHOTOMER 4094 from Henkel Corporation, Ambler, Pa.), 15 parts by weight of a black pigment, 2 parts by weight of talc, 1 part by weight of a photoinitiator available from Aceto Chemical as Quantacure ITX, 3 parts by weight of a photoinitiator available from Ciba-Geigy as Irgacure 907 and 1 part by weight of a photoinitiator available from Ciba-Geigy as Irgacure 369.

What is claimed is:

1. A composition that is useful in the preparation of radiation curable coatings comprising the reaction product of an epoxy component and an acid component comprised of an ethylenically unsaturated carboxylic acid or reactive derivative thereof; reacted in the presence of a polyamide based on a polymerized fatty acid.

2. A composition as claimed in claim 1 wherein said epoxy component is comprised of an epoxidized triglyceride comprised of unsaturated fatty acids.

3. A composition as claimed in claim 1 wherein said epoxy component is comprised of an epoxidized triglyceride comprised of unsaturated fatty acids containing 2 to 10% by weight of epoxide oxygen.

4. A composition as claimed in claim 1 wherein said epoxy component is comprised of an epoxidized oil selected from the group consisting of fats and oils derived from beef tallow, palm oil, lard, castor oil, peanut oil, rapeseed oil, cottonseed oil, soybean oil, train oil, sunflower oil, and linseed oil.

5. A composition as claimed in claim 1 wherein said epoxy component is comprised of an epoxidized oil selected from the group consisting of soybean oil, train oil, sunflower oil, and linseed oil.

6. A composition as claimed in claim 1 wherein said acid component is comprised of a member selected from the group consisting of acrylic acid and methacrylic acid.

7. A composition as claimed in claim 1 wherein said acid component is further comprised of a member selected from the group consisting of saturated aliphatic monocarboxylic acids containing 8 to 24 carbon atoms, unsaturated aliphatic monocarboxylic acids containing 8 to 24 carbon atoms, saturated hydroxycarboxylic acids containing 8 to 24 carbon atoms, and unsaturated hydroxycarboxylic acids containing 8 to 24 carbon atoms.

8. A composition as claimed in claim 1 wherein said acid component is further comprised of a member selected from the group consisting of fatty acids having an even number of carbon atoms and a major portion by weight of the acids have from about 12 to 18 carbon atoms, wherein all fatty acids are saturated or mono-, di-, or tri-unsaturated.

9. A composition as claimed in claim 1 wherein said acid component is further comprised of lauric acid.

10. A composition as claimed in claim 1 wherein said polyamide has a number average molecular weight of up to about 10,000.

11. A composition as claimed in claim 1 wherein said polyamide has a number average molecular weight of from about 1,000 to about 4,000.

12. A composition as claimed in claim 1 wherein said polyamide has a melting point in the range of about 90° C. to about 130° C.

13. A composition as claimed in claim 1 wherein said polyamide is derived from polymeric fatty acids and ethylene diamine.

14. A composition as claimed in claim 1 wherein said polyamide has an amine value from 0 to about 25.

15. A composition as claimed in claim 1 wherein said polyamide has an amine value from 0 to about 5.

16. A composition as claimed in claim 1 wherein said epoxy component is comprised of a diepoxide.

17. A polymerizable composition comprised of the reaction product of claim 1 and a reactive diluent.

18. A method of coating a substrate comprising applying to a substrate a composition comprised of the reaction product of claim 1 and exposing said composition to radiation to cure said composition.

19. A composition that is useful in the preparation of radiation curable coatings comprising a blend of (a) the reaction product of an epoxy component and an acid component comprised of an ethylenically unsaturated carboxylic acid or reactive derivative thereof, and (b) a polyamide based on a polymerized fatty acid.

20. A composition as claimed in claim 19 wherein said epoxy component is comprised of an epoxidized triglyceride comprised of unsaturated fatty acids.

21. A composition as claimed in claim 19 wherein said epoxy component is comprised of an epoxidized triglyceride comprised of unsaturated fatty acids containing 2 to 10% by weight of epoxide oxygen.

22. A composition as claimed in claim 19 wherein said epoxy component is comprised of an epoxidized oil selected from the group consisting of fats and oils derived from beef tallow, palm oil, lard, castor oil, peanut oil, rapeseed oil, cottonseed oil, soybean oil, train oil, sunflower oil, and linseed oil.

23. A composition as claimed in claim 19 wherein said epoxy component is comprised of an epoxidized oil selected from the group consisting of soybean oil, train oil, sunflower oil, and linseed oil.

24. A composition as claimed in claim 19 wherein said acid component is comprised of a member selected from the group consisting of acrylic acid and methacrylic acid.

25. A composition as claimed in claim 19 wherein said acid component is further comprised of a member selected from the group consisting of saturated aliphatic monocarboxylic acids containing 8 to 24 carbon atoms, unsaturated aliphatic monocarboxylic acids containing 8 to 24 carbon atoms, saturated hydroxycarboxylic acids containing 8 to 24 carbon atoms, and unsaturated hydroxycarboxylic acids containing 8 to 24 carbon atoms.

26. A composition as claimed in claim 19 wherein said acid component is further comprised of a member selected from the group consisting of fatty acids having an even number of carbon atoms and a major portion by weight of the acids have from about 12 to 18 carbon atoms, wherein all fatty acids are saturated or mono-, di-, or tri-unsaturated.

27. A composition as claimed in claim 19 wherein said acid component is further comprised of lauric acid.

28. A composition as claimed in claim 19 wherein said polyamide has a number average molecular weight of up to about 10,000.

29. A composition as claimed in claim 19 wherein said polyamide has a number average molecular weight of from about 1,000 to about 4,000.

30. A composition as claimed in claim 19 wherein said polyamide has a melting point in the range of about 90° C. to about 130° C.

31. A composition as claimed in claim 19 wherein said polyamide is derived from polymeric fatty acids and ethylene diamine.

32. A composition as claimed in claim 19 wherein said polyamide has an amine value from 0 to about 25.

33. A composition as claimed in claim 19 wherein said polyamide has an amine value from 0 to about 5.

34. A composition as claimed in claim 19 wherein said epoxy component has an average epoxy functionality of from about 2.6 to about 6.

35. A polymerizable composition comprised of the reaction product of claim 19 and a reactive diluent.

36. A method of coating a substrate comprising applying to a substrate a composition comprised of the reaction product of claim 19 and exposing said composition to radiation to cure said composition.

37. A method of making a composition that is useful in the preparation of radiation curable coatings comprising reacting an epoxy component and an acid component comprised of an ethylenically unsaturated carboxylic acid or reactive derivative thereof, in the presence of a polyamide based on a polymerized fatty acid.

38. A method of making a composition that is useful in the preparation of radiation curable coatings comprising blending a polyamide based on a polymerized fatty acid with the reaction product of an epoxy component and an acid component comprised of an ethylenically unsaturated carboxylic acid or reactive derivative thereof.

39. A printing ink composition containing the resin of claim 1.

40. An overprint varnish composition containing the resin of claim 1.

* * * * *